G. R. GROUT.
VARIABLE THROW CRANK.
APPLICATION FILED MAY 18, 1908.
935,495.
Patented Sept. 28, 1909.
2 SHEETS—SHEET 1.
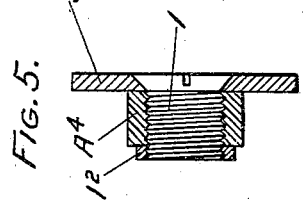
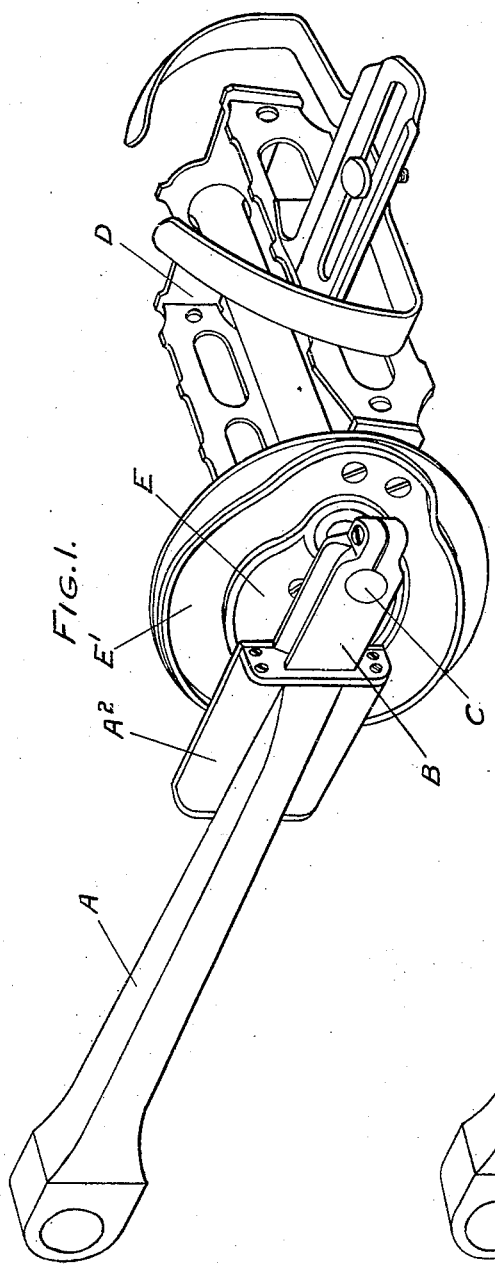
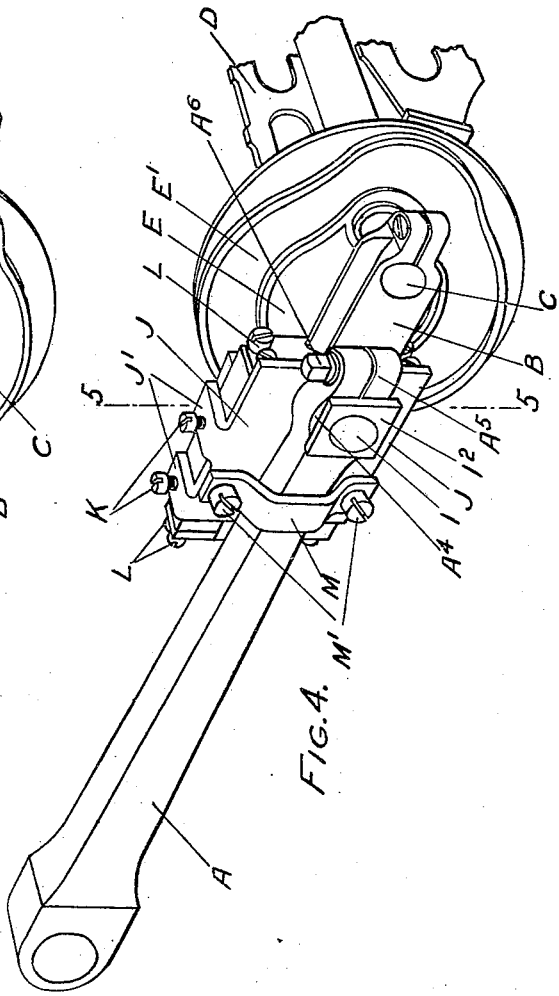
Witnesses
Stanley Wood
Arthur H. Hoppen
Inventor
George Richard Grout
by
Attorney

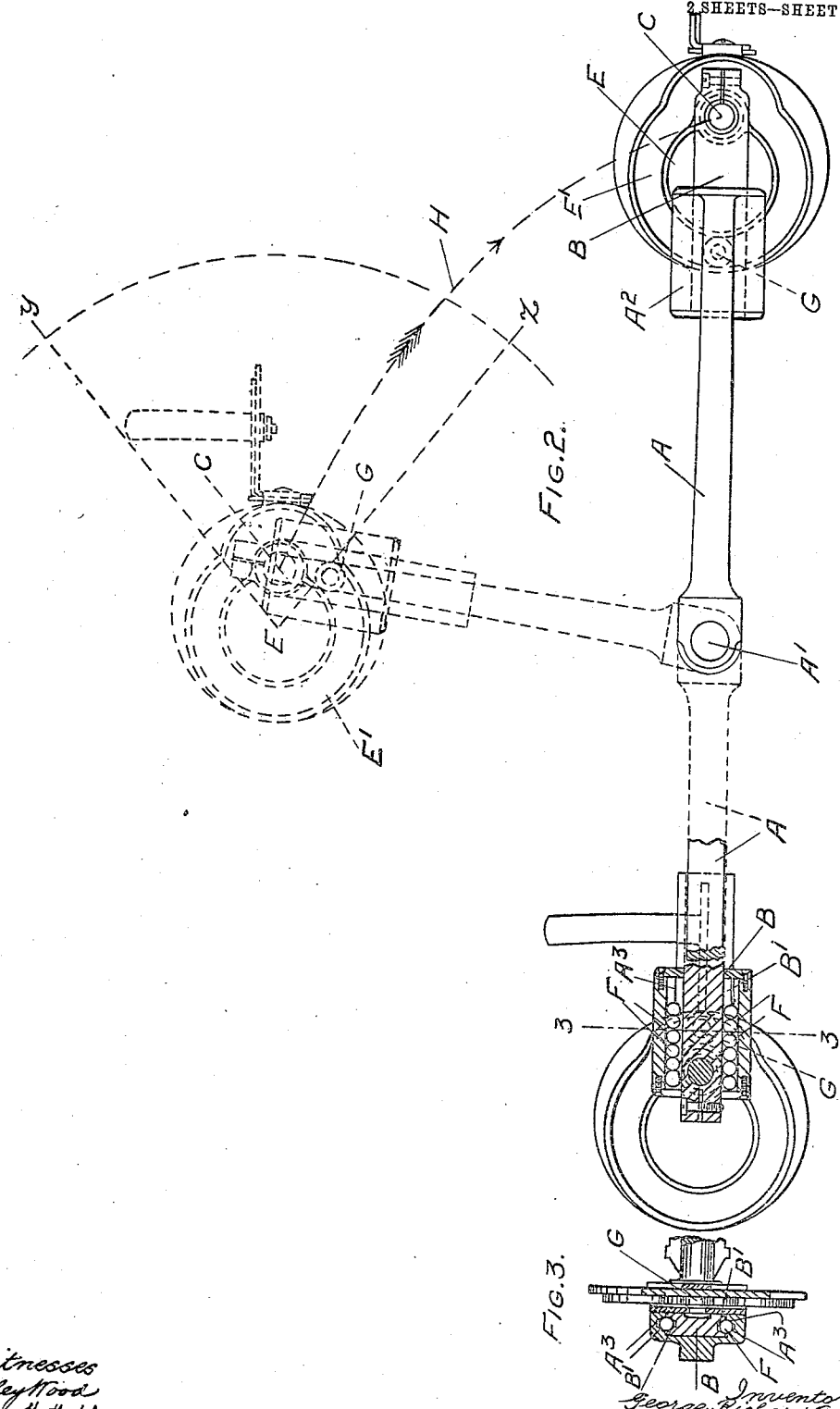

UNITED STATES PATENT OFFICE.

GEORGE RICHARD GROUT, OF WOOD GREEN, LONDON, ENGLAND.

VARIABLE-THROW CRANK.

935,495.  Specification of Letters Patent.  Patented Sept. 28, 1909.

Application filed May 18, 1908. Serial No. 433,550.

*To all whom it may concern:*

Be it known that I, GEORGE RICHARD GROUT, engineer, a subject of the King of Great Britain and Ireland, residing at 112 Victoria road, Wood Green, London, N., England, have invented certain new and useful Improvements in Variable-Throw Cranks, of which the following is a specification.

This invention relates to cranks of the known class in which the length of throw is variable by means of a cam fixed to a pedal or connecting-rod end or other part that the pedal pin or crank pin turns in. The characteristic feature of this invention is the employment in such a device of a cam which is non-circular; it is applicable to various purposes (in steam or other engines, for example), but as it is especially designed for use on cycles in which the power is provided by the rider himself, I will here describe it in its cycle form.

It is not new to employ circular cams fixed to and moving with the pedal or connecting-rod end in variable throw cranks; nor is it new to employ non-circular cams that are stationary and not borne by the pedal or connecting-rod end, but it is believed to be new to employ a non-circular cam fixed as aforesaid to the pedal or connecting-rod end.

The invention will be best understood by reference to the accompanying drawings, in which—

Figure 1 is a general perspective view of the crank and pedal, the latter shown fitted with a toe-clip; Fig. 2 is a diagrammatic view drawn to smaller scale showing the crank in three different positions about its center of motion, part of the mechanism being shown in section; Fig. 3 is a cross section on the line 3—3 of Fig. 2. Fig. 4 is a similar view to Fig. 1 but modified to an existing crank; Fig. 5 is a section showing the pin by which the crank socket is secured to the crank.

Like characters indicate like parts throughout the drawings.

The object of the invention is to provide an improved mechanism of the known class aforesaid in which improved mechanism it shall be secured that while the total path or travel of the crank pin is relatively small, the actual length of crank-throw on the power stroke is relatively large. For example, an ordinary crank having a 7″ throw would on both power and return strokes maintain its 7″ throw; the present crank with substantially a similar path might present only a 6″ crank on the return or non-power stroke and an 8″ crank on the outward or power stroke.

In the construction illustrated in the drawing it will be seen that the complete mechanism comprises the following parts: a crank A secured on the crank-shaft at A′ and having rigidly fixed to it a socket $A^2$; the crank-arm B sliding in the socket $A^2$ and having rigidly secured to it the crank-pin C; the pedal D having rigidly fixed to it the non-circular cam-disk E. The crank-socket $A^2$ is provided with two grooves $A^3$ (Fig. 3) in which lie two rows of balls F, the sliding crank-arm B being similarly grooved at $B^1$, the two sets of grooves forming the races in which the balls F lie. By this arrangement the crank-arm B can freely slide in the crank-socket $A^2$. The crank-socket $A^2$ carries a stud preferably in the form of an anti-friction roller G (Fig. 2) which lies in the non-circular cam-groove E′ of the cam-disk E.

The operation is as follows: Supposing that the view in Fig. 2 represents a side elevation of a crank attached to a bicycle and regarded from the bicycle side, it will be seen that the center portion where the crank is nearly upright and is commencing its power stroke shows it at its shortest stroke, the crank-pin C being then at its nearest position to the crank-shaft A′. The cam-groove E′ at the part between the lines $y$—$z$ in the center portion of Fig. 2 is formed to the arc of a circle struck with the crank-pin C as its center, while the longer portion of the path outside the lines $y$—$z$ is struck as a portion of a circle of the diameter necessary to impart to the crank-pin the required amount of travel longitudinally in relation to the crank. As the crank travels from left to right in the drawing as indicated by the arrow H and dotted path, the roller G having entered upon the larger portion of the cam-groove E′ (and the cam-disk E being fixed to the pedal D and therefore held by the foot of the rider against more than nominal rotation), the continued movement of the crank A causes the roller acting within the groove to push the cam-disk farther from the crank-shaft A′ and carry with it the crank-pin C, which in turn takes the crank-arm B with it so that when the crank reaches the horizontal position at the right of the drawing, the crank-pin C is at its greatest distance from the crank-shaft A'. During the continued movement of the crank on the lower half of its travel, the roller G continues its travel in the cam-groove until at or about its lower vertical position it reaches the commencement of the smaller circular portion y—z, in which part it travels on the upward or return stroke of the crank until it again reaches the vertical position, when the same cycle of operations re-commences.

Figs. 4 and 5 show exactly the same invention as in the previous figures, but the construction is slightly modified so as to make the invention applicable to existing cranks, the same letters of reference indicating the same parts so far as everything except the special details is concerned. In Fig. 4 it will be seen that the crank A terminates in the usual enlargement or head $A^4$ split at $A^5$ and the ends adapted to be closed together by the square headed screw $A^6$. Usually the threaded hole in the head $A^4$ receives the screwed end of the crank-pin which carries the pedal; in the present instance it receives the screwed pin I (Fig. 5) by which the back plate J of the crank socket $A^2$ is secured to the crank; the nut $I^2$ (Fig. 4) may be used or not as desired. As shown in Fig. 4, the plate J has lugs or extensions $J^1$ carrying the set screws K by which an adjustable plate forming part of one of the ball races $A^3$ can be adjusted for wear locked by the screws K and further fastened by the screws L shown in the drawing. The clip or plate M is secured upon the plate J by the screws M' as shown. In this arrangement the ordinary pedal can be removed and the various parts of the invention easily added and the old pedal pin and pedal used and applied as shown in the drawings. The section Fig. 5 shows the screw I countersunk into the plate J screwed into the crank head $A^4$ where it is locked by the screw $A^6$, and provided with the lock nut $I^2$, or not as desired.

What I claim as my invention and desire to secure by Letters Patent is:—

1. A variable throw crank, embracing a propelling member rotatable in a variable path, a cam fixed thereto, a crank-member controlled by said cam, and a slidable crank-arm connection between said crank-member and said cam.

2. A variable throw crank comprising a propelling member rotatable in a variable path, a cam fixed thereto, a crank-member controlled by said cam and having a slidable arm and crank-pin connection between said slidable arm and said cam.

3. A variable throw crank comprising a propelling member rotatable in a variable path, a cam fixed thereto, a crank-member having a stud or pin engaging said cam, and a slidable arm connection between said crank-member and said cam.

4. A variable throw crank comprising a propelling member rotatable in a variable path, a cam fixed thereto and having a groove of general circular outline, laterally elongated, a crank-member having a stud engaging said groove and a slidable arm connection between said crank-member and said cam.

5. A variable throw crank comprising a propelling member, a cam fixed thereto and having a laterally elongated groove, a crank-member having a slotted terminal and a lateral stud playing in said groove and a slidable arm received by the slot of said terminal and having crank-pin connection with said cam.

6. A variable throw crank comprising a propelling member rotatable in a variable path, a crank member, and means connecting said propelling member and crank member for effecting a sliding motion of said propelling member during its rotation.

In testimony whereof I have hereunto signed my name to this specification in the presence of two subscribing witnesses.

GEORGE RICHARD GROUT.

Witnesses:
ELLIS WYNNE OWEN,
H. D. JAMESON.